(12) United States Patent
Fye et al.

(10) Patent No.: US 6,758,776 B2
(45) Date of Patent: Jul. 6, 2004

(54) SPLIT SPROCKET ASSEMBLY, RELATED APPARATUS, AND RELATED MOUNTING METHOD

(75) Inventors: Stephen C. Fye, Glasgow, KY (US); James L. Layne, Bowling Green, KY (US); Michael D. McDaniel, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 10/066,530

(22) Filed: Jan. 31, 2002

(65) Prior Publication Data

US 2003/0144098 A1 Jul. 31, 2003

(51) Int. Cl.$^7$ .......................... F16H 55/12; B65G 23/06
(52) U.S. Cl. ........................................ 474/95; 198/834
(58) Field of Search ................. 474/95, 96; 403/356; 198/834

(56) References Cited

U.S. PATENT DOCUMENTS

| | | | |
|---|---|---|---|
| 476,303 A | 1/1892 | Potter ........................... | 474/95 |
| 528,662 A | 11/1894 | Fawcett ........................ | 474/95 |
| 750,277 A | 1/1904 | Hamilton ...................... | 474/95 |
| 937,111 A | 10/1909 | Sparr ........................... | 74/448 |
| 1,904,535 A * | 4/1933 | Richards ....................... | 403/202 |
| 2,538,499 A | 1/1951 | Benoit .......................... | 464/137 |
| 3,789,687 A | 2/1974 | Cutter .......................... | 474/152 |
| 3,918,311 A | 11/1975 | Maier ........................... | 74/137 |
| 4,031,769 A | 6/1977 | Kassing ........................ | 474/162 |
| 4,253,344 A * | 3/1981 | Kerklies ........................ | 474/96 |
| 4,402,390 A * | 9/1983 | Feeney ......................... | 193/37 |
| 4,502,381 A | 3/1985 | Liguori ......................... | 101/40 |
| 4,929,118 A | 5/1990 | Anderson ..................... | 403/356 |
| 5,037,356 A | 8/1991 | Gladczak et al. ............. | 474/95 |
| 5,085,535 A | 2/1992 | Solberg et al. ................ | 403/24 |
| 5,295,917 A | 3/1994 | Hannum ....................... | 474/95 |
| 5,316,522 A | 5/1994 | Carbone et al. .............. | 474/95 |
| 5,322,478 A | 6/1994 | Bos et al. ...................... | 474/95 |
| 5,378,203 A * | 1/1995 | Baebel .......................... | 474/96 |
| 5,389,044 A | 2/1995 | Bandy, Jr. et al. ............. | 474/96 |
| 5,469,958 A | 11/1995 | Gruettner et al. ............ | 198/834 |
| 5,702,316 A | 12/1997 | Cole ............................. | 474/96 |
| 5,810,686 A | 9/1998 | de Jong et al. ................ | 474/96 |
| 5,833,562 A | 11/1998 | Walker, Sr. ................... | 474/96 |
| 5,848,947 A * | 12/1998 | Fornasiere et al. ........... | 474/96 |
| 5,934,447 A | 8/1999 | Kanaris ........................ | 198/834 |
| 6,074,316 A * | 6/2000 | Murrietta, Sr. ............... | 474/96 |
| 6,146,299 A * | 11/2000 | Harvey ......................... | 474/95 |

FOREIGN PATENT DOCUMENTS

JP       56031557    *  3/1981    .................. 474/96

* cited by examiner

*Primary Examiner*—Thomas R. Hannon
(74) *Attorney, Agent, or Firm*—King & Schickli, PLLC

(57) ABSTRACT

A split sprocket assembly, related apparatus, and a method of mounting a sprocket to a rotatable structure, such as a drive or idler drum, are disclosed. In one embodiment, the sprocket assembly is comprised of at least three sections or segments, each of which is secured to the adjacent section or segment by a fastener, such as a tangentially-extending bolt and nut combination. The sprocket assembly includes a plurality of receivers, each for receiving a key that corresponds to a keyway formed in the rotatable structure. In one embodiment, at least one of the keyways is truncated and, thus, extends only partially across the rotatable structure in the axial direction. A key substantially identical to the truncated keyway in length and width is placed therein, such that the sprocket is prevented from traveling or "walking" along the rotatable structure.

24 Claims, 6 Drawing Sheets

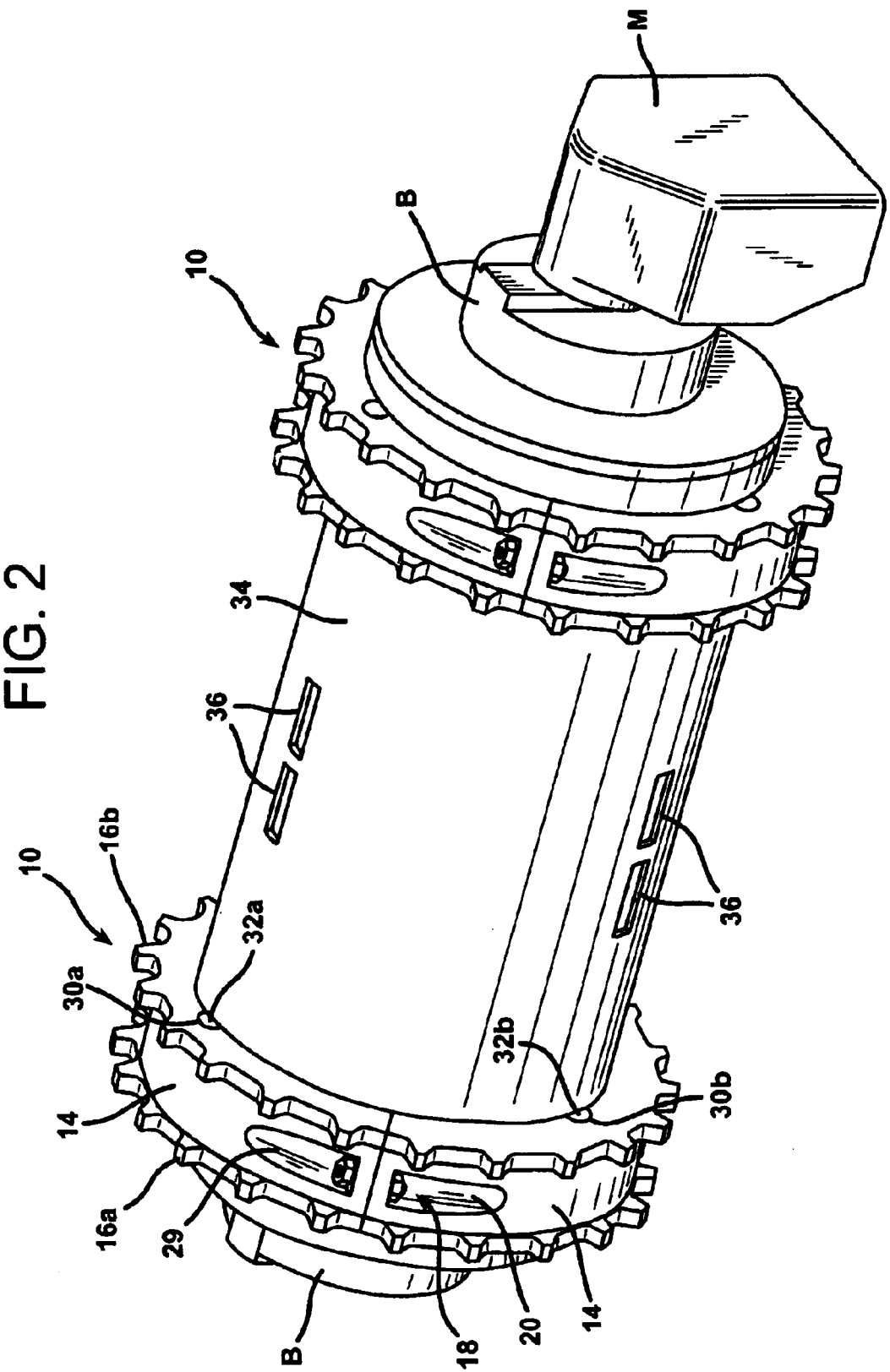

US 6,758,776 B2

SPLIT SPROCKET ASSEMBLY, RELATED APPARATUS, AND RELATED MOUNTING METHOD

TECHNICAL FIELD

The present invention relates to the conveyor art and, more particularly, to an improved split sprocket assembly, a related apparatus, and a related method of mounting a sprocket to a rotatable structure, such as a drum or shaft.

BACKGROUND OF THE INVENTION

Today, in many modern manufacturing facilities, modular conveyor systems are extensively utilized to transport articles to and from various work stations during all stages of production. In recent years, manufacturers using production lines with conveyors as an integral component of the material handling system have realized reasonably significant gains in productivity and resource utilization. As a result, modular conveyor systems have become even more widely implemented and have been adapted to meet an even wider scope of the material handling needs of producers of a multitude of consumer and industrial goods. Therefore, the continual development of improved modular conveyors is necessary in order to keep pace with the demands and expectations of the users of such conveyors.

Conventional conveyor systems employing endless, modular link or roller chain belts are typically driven at one end of an elongated guide structure, such as a rail or the like supported above the ground by a frame. The driving force is transmitted from a motive device, such as a variable speed electric motor, to a plurality of gang-driven sprockets coupled to a rotating drive structure, such as a shaft or drum. At the opposite end of the guide structure, idler sprockets are coupled to a freely-rotating idler shaft or drum. As should be appreciated, the drive and idler sprockets assist in supporting and guiding the endless belt as it makes the transition from the forward run to the return run, or vice versa, at each respective end of the guide structure.

Of course, both the drive and idler sprockets are subject to wear as a result of the substantially continuous engagement maintained with the conveyor belt. If not kept in check, this wear may affect the overall performance of the conveyor system. For example, worn sprockets may allow the belt to slip, which creates both timing and efficiency problems. Hence, it is necessary to perform an inspection of the sprocket(s) from time to time to determine whether some form of ameliorative action, such as a repair operation or perhaps even a complete replacement, is required.

While inspection may only require removing the belt to gain visual access to the sprocket, repairing or completely replacing a unitary sprocket requires removing it from the corresponding support shaft or drum altogether. In the case where a single drive or idler sprocket is carried on the shaft or drum, removing the belt and the sprocket is a relatively uncomplicated undertaking. However, in the situation where a plurality of sprockets are gang driven or carried on a single support shaft or drum, removing any of the inner sprockets becomes a time and labor intensive process, since all adjacent outer sprockets and any other corresponding structures (side plates, chain guides/strippers, conveyor frame components or other support structures, etc.) must first be removed. As should be appreciated, removing even one of the sprockets in a gang-driven arrangement significantly increases the time and labor involved. Additionally, the wholesale removal and replacement of multiple sprockets carried on a shaft may create alignment and/or timing problems that must be corrected to ensure efficient operation. Of course, the time and labor required to remedy these problems further exacerbates the situation.

Others in the past have proposed a number of different types of arrangements to solve these problems. One popular proposal is to use a split sprocket consisting of two mating halves that are coupled together over a shaft. With this arrangement, removal of the sprocket can be accomplished without dismantling the entire conveyor assembly. Modem examples of various types of split sprockets are found in U.S. Pat. No. 6,202,834 to Layne et al, U.S. Pat. No. 6,146,299 to Harvey, and U.S. Pat. No. 6,086,495 to Stebnicki et al., the disclosures of which are hereby incorporated by reference.

In the case of a rotatable drive or idler drum, it is known to couple a single-piece, unitary sprocket to the drum using a plurality of cylindrical keys or pins. For example, U.S. Pat. No. 5,934,447 to Kanaris discloses an arrangement in which the drum includes a plurality of shallow grooves extending axially along its entire surface. Keys received in the sprocket fit in the corresponding shallow grooves and, as a result, keep it spaced from the outer surface of the drum. A radially extending set screw is used to press each key into the corresponding groove to rotatably couple the sprocket to the drum.

While this arrangement does provide the limited advantage of allowing for the adjustment of the position of the sprocket along the drum, there are countervailing disadvantages. For example, during extended periods of use, the set-screws may loosen and allow the keys and, hence, the sprocket to "walk" or travel axially along the surface of the drum. This is deleterious, since it not only increases the wear on the sprocket, but also causes chattering and wear on the belt. If the set-screws loosen to a sufficient degree to allow the key to move out of the shallow groove in the drum, the sprocket may slip and, in the case of a driven drum, transmit no drive power or torque to the belt. Of course, the set-screws may be frequently inspected or tightened down in an effort to prevent these deleterious occurrences, but this inevitably increases the maintenance effort and overall operational cost.

Accordingly, the foregoing discussion identifies a particular need for an improved manner of mounting a sprocket to a rotatable structure, such as a drive or idler drum in a conveyor system. It is envisioned that by splitting the sprocket into two or more sections or segments, it would be possible to provide a key for each section or segment that corresponds to a separate keyway formed in the outer surface of the rotatable structure. The sections or segments could also be coupled together and held in tension, such as by tangentially-extending fasteners. The tension would create a sufficient radially-directed holding force to ensure that the keys remain securely held in the keyways during rotation while eliminating the need for radially-extending set-screws. One or more of the keyways could also be truncated and the keys sized for fitting in the truncated keyway(s) in relatively tight seated engagement. This would prevent the sprocket from traveling or "walking" along the surface of the drum in use. Overall, this combination of features would result in a sprocket assembly that is a significant improvement over those proposed in the past, especially in terms of maintenance cost, operational efficiency, and reliability.

SUMMARY OF THE INVENTION

In accordance with a first aspect of the invention, a sprocket assembly intended for mounting on a rotatable structure, such as a drum or shaft, for engaging an endless conveyor belt making the transition between a forward and a return run or vice-versa is disclosed. The assembly comprises at least three unitary sprocket sections or segments, with each of the sections or segments including an arcuate inner surface for engaging an outer surface of the rotatable structure. A plurality of fasteners are also provided, each for fastening one of the plurality of sprocket sections to an adjacent sprocket section to form the sprocket assembly.

Each of the arcuate sprocket sections or segments includes a first end and a second end. In one embodiment, the first end includes a tangentially-extending bore and the second end includes a corresponding aperture for receiving a threaded bolt forming a part of one of the fasteners. The engagement of the bolt extending through the aperture in the first end of one sprocket section or segment into the bore in a second end of the adjacent sprocket section or segment assists in securing the two structures together. In another embodiment, each of the ends includes a mating face having a matching aperture formed therein for receiving a threaded bolt forming a part of one of the fasteners. When the ends of two adjacent sprocket sections or segments are abutting in the mated position, the apertures are positioned such that a centerline extending through them is generally parallel to a line drawn tangent to a point located at an interface between the adjacent ends. To complete the fastener and secure the adjacent sections or segments together, a nut is then placed on the bolt and tightened.

Each of the sections or segments may include a receiver, or alternatively two adjacent sections or segments may together form a receiver. Each receiver is capable of receiving and holding a key that is adapted to fit into a keyway formed in or on the rotatable structure, such as a shaft or drum. The key is preferably cylindrical, in which case, the receiver is C-shaped. However, using keys having other shapes is entirely possible, with the corresponding receiver and keyway generally having a matching shape.

Instead of the three sections or segments described above, the sprocket assembly may comprise at least four sprocket sections or segments. As with the three piece embodiment, each of the four sprocket sections or segments may include a first end and a second end. Preferably, each end includes an aperture for receiving a threaded bolt forming a part of one of the plurality of fasteners. When the ends of two sprocket sections or segments are positioned adjacent to each other in abutment, a centerline extending through the matching apertures is generally parallel to a line drawn tangent to a point at an interface between the adjacent ends. To complete the assembly of the two adjacent sections or segments, a nut may be placed on the bolt and tightened.

In accordance with a second aspect of the invention, a sprocket assembly intended for mounting on the outer surface of a rotatable structure, such as a drum or shaft, for engaging an endless conveyor belt making the transition between a forward and a return run is provided. The assembly comprises a plurality of sprocket sections or segments (preferably two, three, or four), with each section or segment having an arcuate inner surface and at least two ends. Each of the ends includes an aperture and a plurality of fasteners for fastening a first end of one of the plurality of sprocket sections to a second, corresponding end of an adjacent sprocket section are provided. Specifically, the fasteners include a threaded bolt for positioning through a matching pair of the apertures in the first and second ends and a nut for placement on a portion of the bolt projecting through one of the apertures. A centerline extending through the matching pair of the apertures is generally parallel to a line drawn tangent to a point at an interface between the ends of two adjacent sprocket sections or segments when positioned in an abutting relationship. As a result of this fastening arrangement, tightening of the nut against a surface of the sprocket section or segment adjacent to the aperture through which the bolt projects creates a tension between the adjacent sprocket sections. Each sprocket section or segment may further include a C-shaped receiver for receiving a substantially cylindrical key, whereby a portion of the key projects from the inner surface of the section or segment for engaging a keyway formed in the rotatable structure and is held in place by the tension mounting.

In accordance with a third aspect of the invention, an apparatus intended for use in engaging and guiding an endless conveyor belt making the transition between a forward and a return run or vice-versa is disclosed. The apparatus comprises a structure, such as a drum or shaft, mounted for rotation about an axis. The rotatable structure includes an outer surface having a first plurality of keyways, with at least one of the first keyways being truncated and thus extending only partially across the outer surface in an axial direction. A first split sprocket comprised of at least three sections or segments is also provided. The first sprocket includes an inner surface and a plurality of receivers. A first plurality of keys are also provided, with each key being positioned at least partially in one of the receivers such that a portion thereof projects inwardly and is adapted for seating engagement in one of the first keyways. A fastener for fastening each sprocket section or segment to an adjacent sprocket section or segment is also provided.

In one embodiment, the rotatable drum is cylindrical and the inner surface of each the sprocket section or segment is arcuate. Additionally, each receiver is substantially C-shaped, in which case each key is cylindrical and is slidably received in the corresponding receiver. The corresponding keyway is also semi-circular. Instead of being slidably received, each key may be received in the corresponding receiver in snap-fit engagement. Preferably, the width of each keyway in the axial direction is substantially identical to the width of the key and the length of each keyway at the surface of the rotatable structure is substantially equal to of less than the diameter of the key.

In addition, the split sprocket may be formed of four sections or segments. The fourth sprocket section or segment is secured to one of the at least two sprocket sections or segments and the third section or segment using fasteners. Also, the fourth sprocket section or segment may include a receiver for slidably receiving a key for engaging one of the first keyways.

In addition to the first keyways, a second plurality of keyways may be provided, with at least one of the second keyways extending only partially across the outer surface of the rotatable structure in the axial direction. The apparatus may further comprise a second split sprocket comprised of at least two sections or segments having an inner surface and a plurality of receivers; a second plurality of keys, each key positioned at least partially in one of the receivers such that a portion thereof projects inwardly from the second split sprocket, the portion being adapted for seating engagement in one of the second plurality of keyways; and a second plurality of fasteners for fastening the at least two sections or segments of the second split sprocket together. A third plurality of keyways, including at least one third keyway extending only partially across the outer surface of the drum or shaft in the axial direction, may also be provided. The first or second split sprockets may be alternately fastened to the rotatable structure using the third keyways.

In accordance with a fourth aspect of the invention, a method of mounting a split sprocket over a rotatable structure, such as a drum or shaft, is provided. The method comprises fastening at least three unitary toothed sections or segments together over the rotatable structure to form a first sprocket, while simultaneously securing the sprocket to the rotatable structure so as to prevent axial movement along the outer surface thereof. The step of fastening may include securing a tangentially-extending fastener between adjacent sprocket sections or segments. The rotatable structure may include a plurality of circumferentially-aligned, truncated keyways, and the step of securing the sprocket to the rotatable structure may include positioning a key in each one of a plurality of receivers formed in the sprocket such that at least a portion of the key projects inwardly therefrom and is received in one of the keyways.

BRIEF DESCRIPTION OF THE DRAWINGS

The accompanying drawings incorporated in and forming a part of the specification illustrate several aspects of the present invention and, together with the description, serve to explain the principles of the invention.

In the drawings:

FIG. 2 is a perspective view of two of the sprockets of FIG. 1 mounted on the ends of a driven drum in a conveyor system;

DETAILED DESCRIPTION OF THE PREFERRED EMBODIMENT

Figure 1:
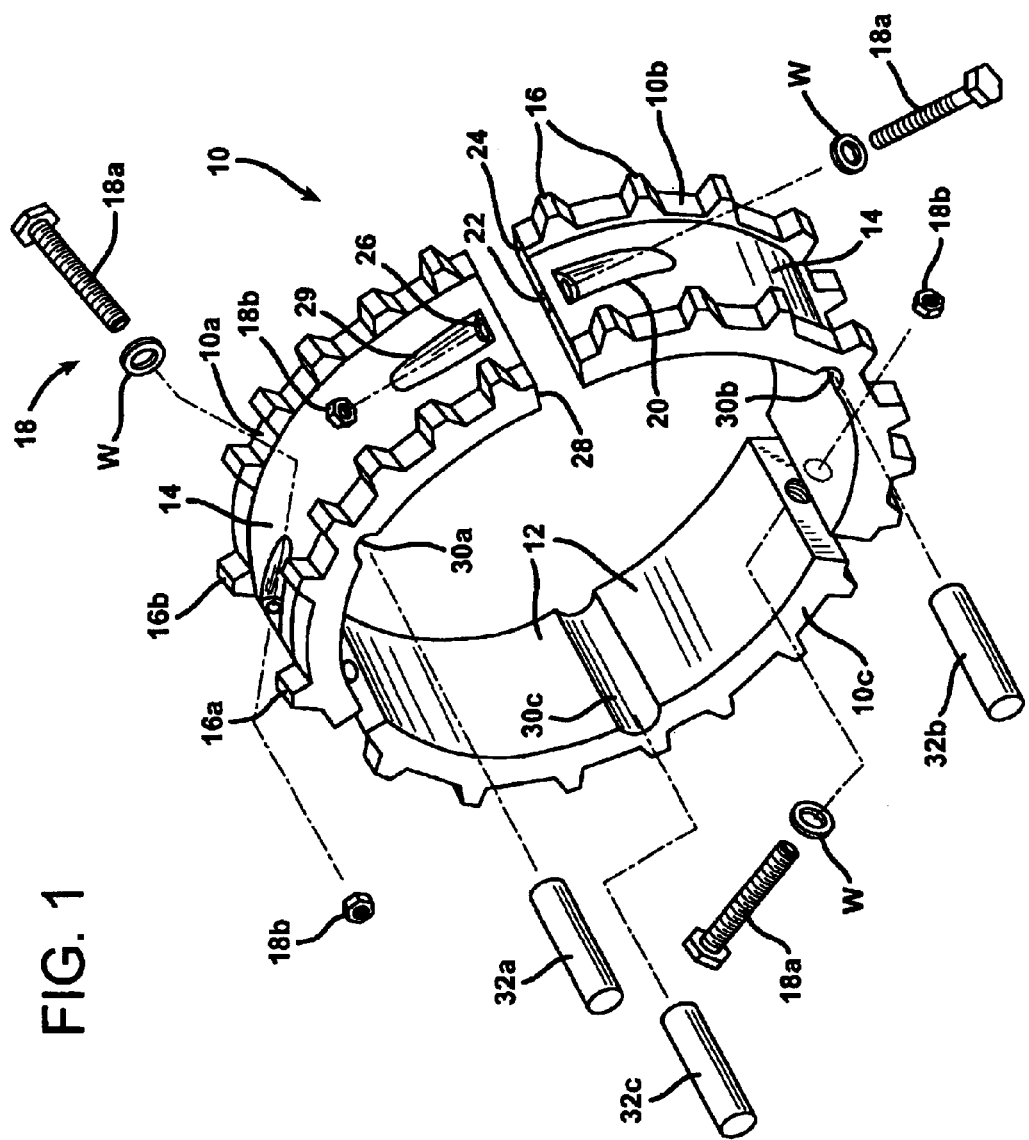
FIG. 1 is an exploded, perspective view of one embodiment of a split sprocket assembly constructed in accordance with the principles of one aspect of the present invention.

With reference to the exploded perspective view of FIG. 1, a sprocket 10 for use in forming a part of a conveyor system (not shown), such as one including an endless modular link conveyor belt, is disclosed. As described further below, the sprocket 10 is divided into at least two segments or sections 10a, 10b, with a sprocket comprised of three such segments or sections 10a, 10b, 10c being shown in FIG. 1. Together, these sections or segments 10a, 10b, 10c form the complete annular (360°) sprocket 10, with each possibly comprising an arc of approximately 120°, as shown in FIG. 1. Of course, this manner of division is preferred for purposes of simplicity, but it is within the broadest aspects of the invention to divide the sprockets into two or more unequal sections or segments, as may be desired for a particular application.

In the preferred embodiment shown in FIG. 1, each of the three segments or sections 10a, 10b, 10c is unitary in nature and includes an inner arcuate surface 12 and an outer surface 14 having a plurality of teeth 16. The teeth 16 are shown as being provided in two spaced apart rows 16a, 16b, although it should be appreciated that the number of rows and their spacing may vary depending on the type of belt or chain being engaged by the sprocket 10. Indeed, certain arrangements may require only a single, integral row of teeth (not shown). Also, while a plurality of teeth are shown, providing each section or segment with a single tooth is of course an option.

It is further noted that the illustrated sprocket 10 includes twenty-one teeth, with each segment or section 10a, 10b, 10c thus including seven teeth. However, as suggested above, it is possible to provide more or fewer teeth, depending on the pitch of the particular type of belt being engaged. In the case of the three-piece sprocket shown in FIG. 1, it should be appreciated that arrangements where the number of teeth are evenly divisible by three are preferred, since this allows for each sprocket segment or section 10a, 10b, 10c to include the same number of teeth and promotes interchangeability. Also, it is easier for the worker assembling the sprocket 10 to do so when the segments or sections 10a, 10b, 10c each have an equal number of teeth, as mismatching is not a problem. However, it is within the broadest aspects of the invention to provide a three-piece sprocket 10 with each piece having a different number of teeth (and, as noted above, possibly comprising an arc that is less or greater than 120°).

Figure 1A:
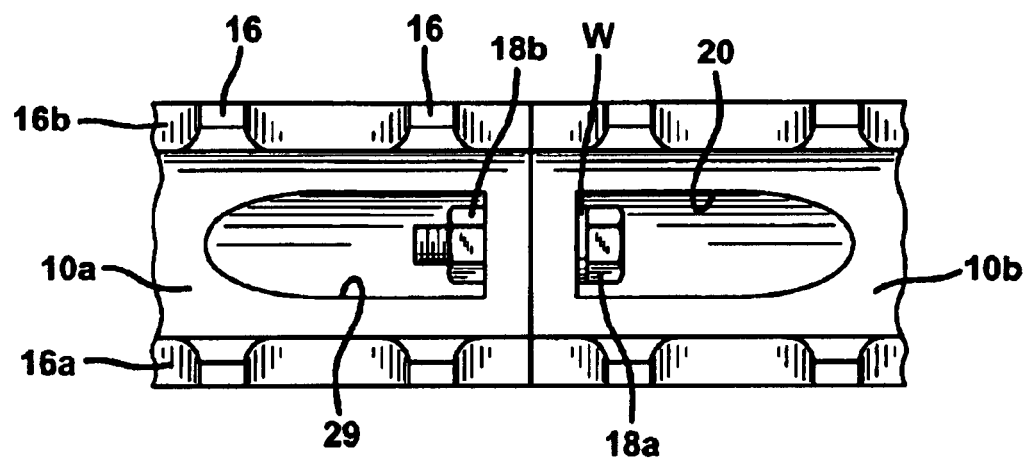
FIG. 1a is a cutaway top view showing one manner for fastening two adjacent sprocket sections or segments together.
Figure 1B:
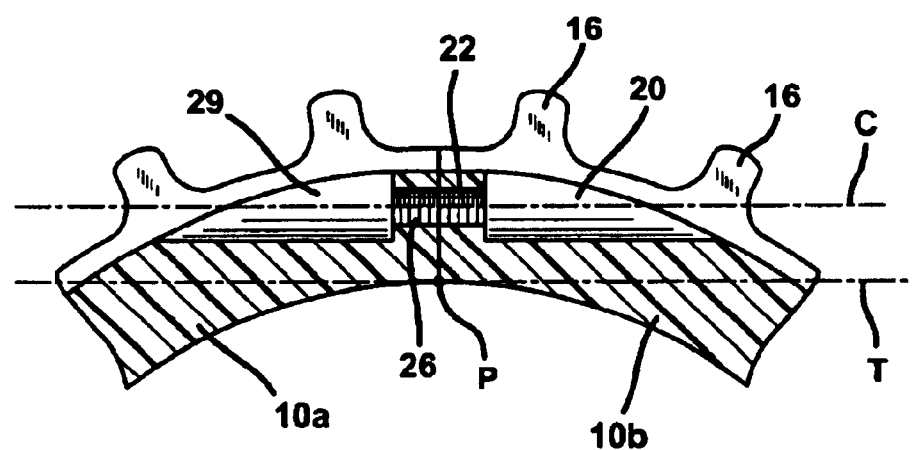
FIG. 1b is a cutaway, partially cross-sectional side view showing the arrangement of FIG. 1a with the fastener removed.

In the exploded view of FIG. 1, one possible manner of assembling the sprocket sections or segments 10a, 10b, 10c is disclosed. The assembly method includes the use of fasteners 18, which are shown as the combination of a threaded bolt 18a and nut 18b. In the illustrated embodiment, as perhaps best shown in the enlarged view of FIG. 1a, the bolt 18a is inserted into a tangentially-extending, generally U-shaped groove 20 formed in the outer surface of one end of each sprocket segment or section, such as section 10b in FIG. 1, through an aperture 22 formed in the adjacent flat face 24, and into an aperture 26 in the matching face 28 of the next-adjacent sprocket section or segment, such as section 10a in FIG. 1. The next-adjacent sprocket section or segment 10a also includes a tangential groove 29 sized to allow the threading of the nut 18b onto the projecting end of the bolt 18a. As should be appreciated, the result is that an imaginary centerline C drawn through the apertures 22, 26 extends essentially or generally parallel to a tangent T to the arcuate inner surfaces 12 drawn at a point P located at the interface between the matching faces 24, 28 (see FIG. 1b). An optional washer W may also be provided, such as for positioning adjacent to the head of the bolt 18a.

Figure 1C:
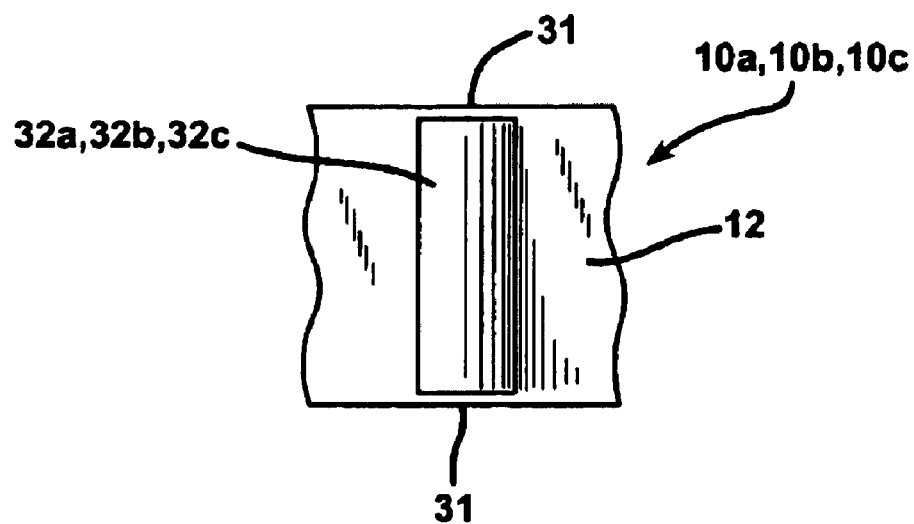
FIG. 1c is a top view of a cylindrical key positioned in a receiver formed in the inner surface of one of the sprocket sections or segments, with the receiver including a pair of sidewalls.

The sprocket 10 is also provided with a plurality of receivers, each for receiving a key that couples it to the adjacent rotatable structure, such as a shaft or drum. In the illustrated embodiment, the receiver is in the form of a recess 30a, 30b, 30c formed in each section or segment 10a, 10b, 10c comprising the split sprocket 10. As perhaps best shown in FIGS. 1 and 3, each recess 30a, 30b, 30c is substantially C-shaped and is sized for receiving a substantially cylindrical pin or key 32a, 32b, 32c. Each key 32a, 32b, 32c may be slidably inserted into the corresponding recess 30a, 30b, 30c, or if the resiliency of the material forming the sprocket section or segment 10a, 10b, 10c so permits, may be pressed into place such that a snap-fit engagement is formed. The fit should be such that the friction between the outer surface of the key 32a, 32b, 32c and the inner surface of the recess 30a, 30b, 30c (or the gripping force provided by the snap-fit engagement) is sufficient to resist relative movement. To enhance the friction, either or both surfaces may be provided with roughening or the like. Alternatively, in the case of a snap-fit engagement, each recess 30a, 30b, 30c may include opposed sidewalls 31 (see FIG. 1c) that capture the corresponding key 32a, 32b, 32c and prevent it from moving from side-to-side. Still another alternative is to provide only a single sidewall (not shown) on only one side of each recess 30a, 30b, 30c.

Figure 3:
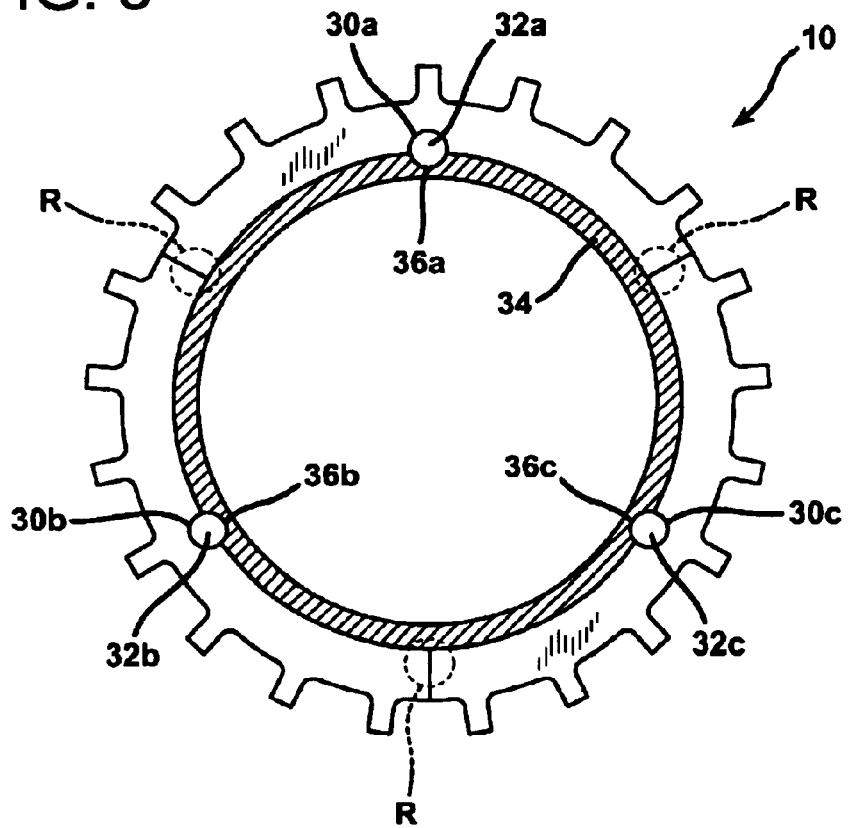
FIG. 3 is a cross-sectional view of one of the sprockets mounted to a drum, like the one shown in FIG. 2.

Due to the C-shape of each recess 30a, 30b, 30c, it should be appreciated that, once each key 32a, 32b, 32c is in the installed position, a portion of it projects inwardly relative to the inner arcuate surface 12 of the corresponding sprocket section or segment 10a, 10b, 10c (see, e.g., the cross-sectional view of FIG. 3). The corresponding rotatable structure on which the sprocket 10 is mounted in use, such as the driven drum 34 shown in FIG. 2, includes a plurality of keyways 36, each for receiving one of these keys 32a, 32b, 32c. In the illustrated example, each keyway 36 is thus semi-circular in shape, as perhaps best understood with reference to the cross-sectional view of FIG. 3. At least two, and preferably three keyways 36a, 36b, 36c are provided for the three-piece sprocket 10 shown in FIG. 3, one for receiving each key 32a, 32b, 32c.

In accordance with one important aspect of the mounting method disclosed herein, at least one and preferably each keyway 36a, 36b, 36c provided is truncated and, thus, extends only partially across the outer surface of the drum 34 in the axial direction. Moreover, the keys 32a, 32b, 32c are sized in terms of both width and length to fit in a relatively tight seated engagement in the keyways 36a, 36b, 36c, which are shown as being circumferentially aligned. Hence, when the sprocket 10 is mounted to the drum 34 such that the keys 32a, 32b, 32c are seated in the keyways 36a, 36b, 36c, positive engagement is established and lateral movement is prohibited. In other words, the sprocket 10 rotates with the drum 34, but is prevented from moving or "walking" along it in the axial direction, as long as at least one of the keyways 36a, 36b, 36c is truncated. In the case of a driven sprocket, this direct mounting arrangement advantageously improves torque transfer and thus enhances efficiency. Preferably, several groups of strategically positioned, truncated keyways 36, such as the series of centered keyways shown in FIG. 1, are provided to allow for the positioning of sprockets 10 at various locations along the surface of the drum 34. Again, the particular locations of the keyways 36 and the relative positioning of the sprockets depends on the needs of the specific conveyor system or application.

To mount the sprocket 10 to the drum 34 in the preferred embodiment, the three sections or segments 10a, 10b, 10c are assembled as described above, with the fasteners 18 loosely holding the sections and segments in place and the keys 32a, 32b, 32c held in the respective recesses 30a, 30b, 30c. The keys 32a, 32b, 32c are then aligned with the respective keyways 36a, 36b, 36c and the fasteners 18 tightened down such that the inner surface of each sprocket section or segment 10a, 10b, 10c makes direct contact with the outer surface of the drum 34. As should be appreciated, the radially-directed holding force resulting from the tension mount created by the fasteners 18 coupling the sprocket segments 10a, 10b, 10c and the resistance to lateral movement afforded by the truncated keyways 36a, 36b, 36c avoids the need for set-screws or the like. The split nature of the sprocket 10 also allows for easy removal for inspection, repositioning, or replacement, without requiring the dismounting of the adjacent structures forming a part of the conveyor system, such as a motive device M in the case of a driven sprocket (see FIG. 2), the bushings B, or the sidewalls forming a part of the conveyor frame (not shown) in the case of either a drive or idler sprocket (not shown).

Figure 4A:
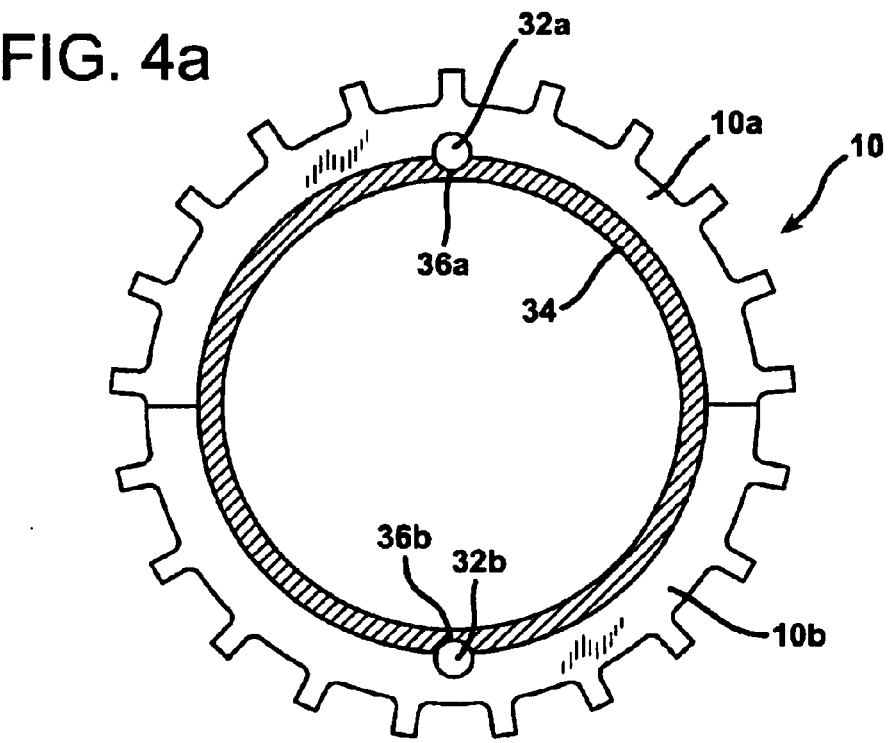
FIG. 4a is a cross-sectional view of a sprocket comprised of two sections or segments mounted on a drum.

In the embodiment of FIG. 4a, the sprocket 10 includes only two segments or sections 10a or 10b, each of which is illustrated as comprising an arc of approximately 180°. As depicted, each segment or section 10a, 10b is preferably held in place by a single key 32a, or 32b that fits in a corresponding keyway 36a or 36b on the drum 34, which is shown as being hollow in cross-section. The same types of fastening arrangement or fastening means shown in FIG. 1 may be used to secure the sprocket 10 to the drum 34. At least one and preferably both of the keyways 36a, 36b are truncated as described above to prevent the sprocket 10 from moving axially along the surface of the drum 34.

Figure 4B:
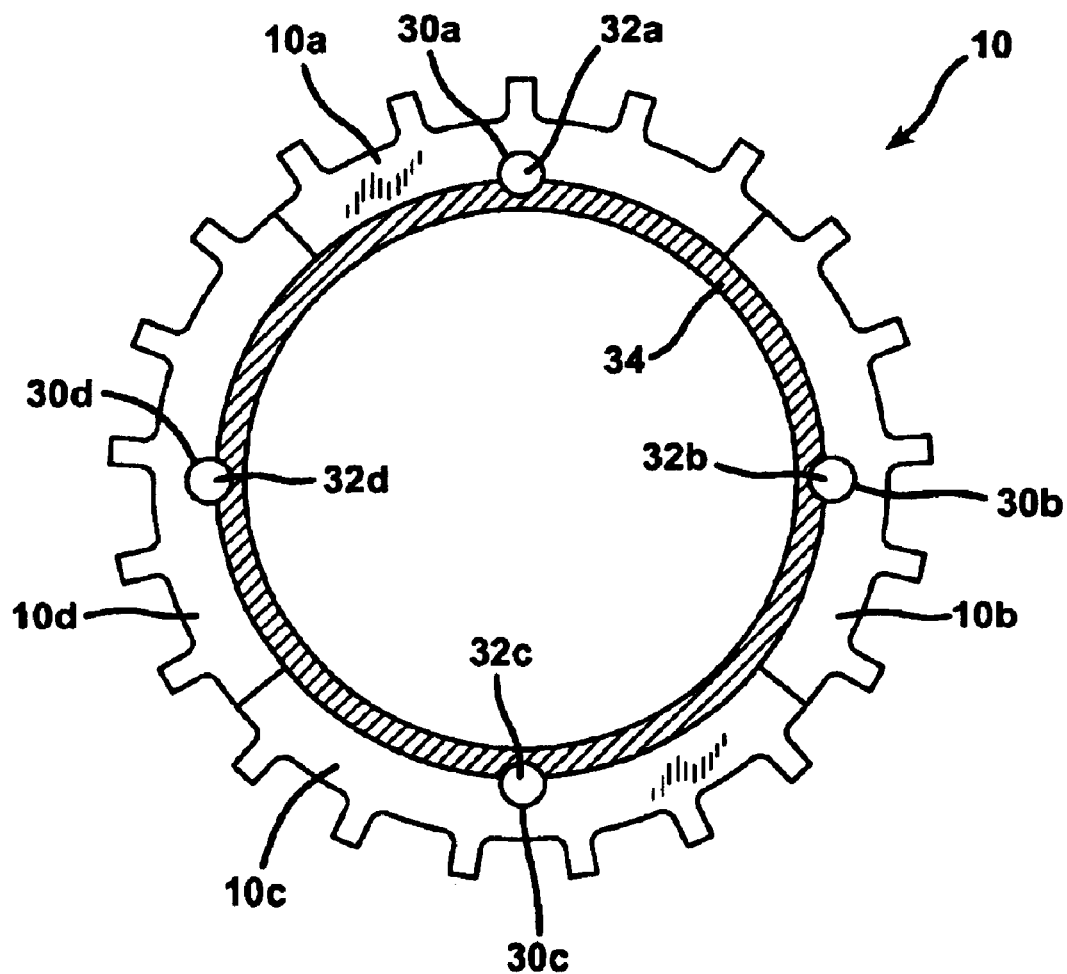
FIG. 4b is a cross-sectional view of a sprocket comprised of four sections or segments mounted on a drum.

The next embodiment, shown in FIG. 4b, is a sprocket 10 comprised of four sections or segments 10a–10d, each of which is illustrated as comprising an arc of approximately 90°. The sections or segments 10a–10d may be held together using fasteners 18, such as the tangentially-extending bolt/nut combinations described above, or any other equivalent means. The same type of arrangement of inwardly projecting keys and keyways may be used, but it should be appreciated that each section or segment 10a–10d may be provided with a receiver or recess 30a–30d. Each recess 30a–30d is adapted for receiving a key 32a–32d that fits in the corresponding keyway 36a–36d, at least one of which is truncated in the axial direction. Alternatively, it should be appreciated that more or fewer recesses may be provided, and that all recesses provided need not include keys, as long as the mounting that results is secure and causes the sprocket 10 to reliably rotate with the drum 34.

In both the embodiments shown in FIGS. 4a and 4b, it should be appreciated that when an odd number of total sprocket teeth are present (such as the twenty-one in this exemplary embodiment), the sections or segments may have different numbers of teeth. For example, in FIG. 4a, the upper section 10a includes eleven teeth, but the lower section 10b includes only ten teeth. Likewise, in the embodiment of FIG. 4b, three sections 10a, 10b, and 10d include five teeth, while one section 10c includes six. While providing the sprocket sections or segments 10a . . . 10n with different numbers of teeth slightly complicates the assembly of the sprocket 10, symbols (such as embossments or other markings) or color coding may be used to allow the worker to easily determine which sprocket sections or segments should abut each other in the mounted position.

As is well-known in the art, the sprocket sections or segments 10a . . . 10n may be formed of a lightweight, wear resistant polymeric material, such as ultra-high molecular weight (UHMW) polyethylene. The use of such a material is preferred in view of the relatively low expense, good wear properties, and a commensurate service life. However, the use of other materials to form the sprocket sections or segments 10a . . . 10n, including metal, is possible. The drum 34 may be formed of metal, such as stainless steel, and is preferably hollow to reduce weight and promote efficiency. The fasteners 18 and keys 36 may also be formed of metal.

Figure 1D:
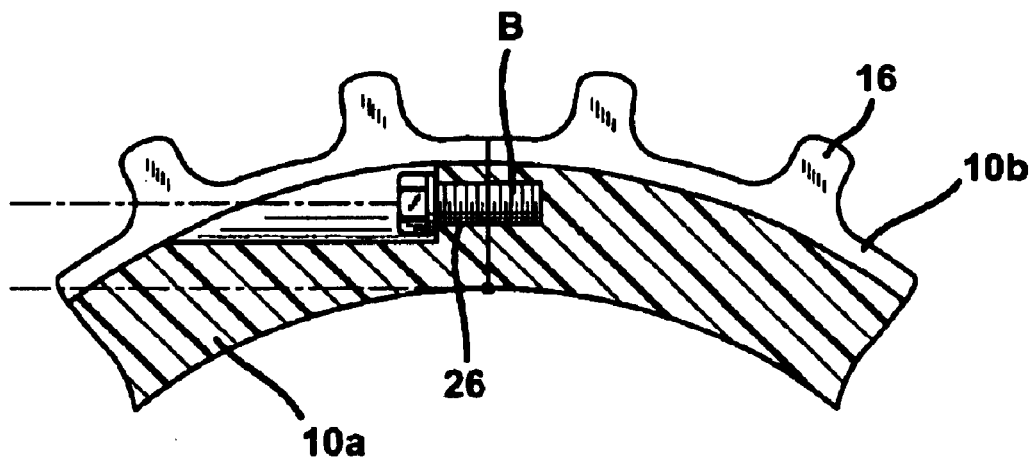
FIG. 1d is a partially cross-sectional view of an alternate arrangement for fastening two adjacent sprocket sections or segments together.

The foregoing description of the various embodiments of the invention is presented for purposes of illustration and description. It is not intended to be exhaustive or to limit the invention to the precise form disclosed. Modifications or variations are possible in light of the above teachings. For example, instead of providing an aperture in both end faces of each sprocket section or segment 10a, 10b, 10c for receiving a fastener, such as a bolt, one end may be provided with a threaded bore B in place of the aperture for receiving the fastener 18 in the form of a threaded screw (see FIG. 1d). This arrangement works especially well when the sprocket 10 is formed of metal or, of formed of other materials, the bore B is provided with a threaded metal insert (not shown) for receiving the fastener 18/screw. In other cases, this arrangement may not provide adequate tension to achieve a high degree of reliability. Also, while a cylindrical key and keyway are shown for purposes of illustration, it should be appreciated that many other cross-sectional shapes may work, including square keys, triangular keys, or polygonal keys, as long as the arrangement used is capable of causing the sprocket 10 to positively engage and rotate with the structure to which it is mounted, such as drum 34. Another possible modification is to form one or more of the receivers/recesses 30a, 30b, 30c at the interfaces between adjacent sprocket sections or segments 10a, 10b, 10c (see phantom line depiction R in FIG. 3), such that the key is captured therein when the sprocket 10 is fastened down over the drum 34 or other rotatable structure. The truncated keyways 36 could also be apertures in the drum 36, such as for receiving the projecting portion of a cylindrical key projecting beyond the inner surface of the sprocket 10 (or another shape of key, such as a "hybrid" key including a cylindrical head and a rectangular projecting portion for extending into the keyway/aperture formed in the drum 34). The embodiments chosen were described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A sprocket assembly intended for mounting on an outer surface of a rotatable structure, drum, or shaft, adjacent an endless conveyor belt making the transition between a forward and a return run or vice-versa, comprising:

at least three unitary sprocket sections or segments, each having an arcuate inner surface;

a fastener for fastening a first end of each of the plurality of sprocket sections or segments to a corresponding end of an adjacent sprocket section or segment to form the sprocket assembly, wherein two adjacent sections or segments together form a receiver for receiving a key, whereby the key fits at least partially into a keyway formed on or in the outer surface of the rotatable structure.

2. The sprocket assembly according to claim 1, wherein each of the sprocket sections or segments includes a second end, the first end including a tangentially-extending bore and the second end including a corresponding aperture for receiving a threaded bolt forming a part of one of the fasteners, whereby the engagement of the bolt in the bore assists in securing two adjacent sprocket sections or segments together.

3. The sprocket assembly according to claim 1, wherein each of the sprocket sections or segments includes a second end, each of the ends including a mating face having an aperture formed therein for receiving a bolt forming a part of one of the fasteners, wherein:

a centerline extending through a matching pair of the apertures is generally parallel to a line drawn tangent to a point at an interface between the ends of two adjacent sprocket sections or segments; and a nut is placed on the bolt and tightened to secure the two adjacent sprocket sections or segments together.

4. The sprocket assembly according to claim 1, further including at least four sprocket sections or segments, wherein each of the four sprocket sections or segments includes a second end, each of the ends including a mating face having an aperture formed therein for receiving a bolt forming a part of one of the fasteners, wherein:

a centerline extending through a matching pair of the apertures is generally parallel to a line drawn tangent to a point at an interface between two adjacent sprocket sections or segments; and a nut is placed on the bolt and tightened to secure the two adjacent sprocket sections or segments together.

5. A method of driving a conveyor belt using the sprocket assembly of claim 1.

6. A sprocket assembly intended for mounting on the outer surface of a rotatable structure, drum, or shaft, adjacent an endless conveyor belt making the transition between a forward and a return run, comprising:

a plurality of sprocket sections or segments, each of the sections or segments having an arcuate inner surface and at least two ends, each of the ends including an aperture, and a receiver for receiving a key, whereby a portion of the key projects from the inner surface of the section or segment for engaging a keyway formed in the rotatable structure;

a fastener for fastening a first end of each of the plurality of sprocket sections to a second, corresponding end of an adjacent sprocket section, each fastener including a threaded bolt for positioning through said apertures in said first and second ends and a nut for placement on a portion of said bolt projecting through one of said apertures;

wherein a centerline extending through a matching pair of the apertures is generally parallel to a line drawn tangent to a point at an interface between the ends of two adjacent sprocket sections or segments when positioned in an abutting relationship, and whereby tightening of the nut against a surface of the sprocket section or segment adjacent to the aperture through which the bolt projects creates a tension between the adjacent sprocket sections.

7. The sprocket assembly according to claim 6, wherein two, three, or four sprocket sections or segments are provided.

8. A method of driving a conveyor belt using the sprocket assembly of claim 6.

9. An apparatus intended for use in conjunction with an endless conveyor belt making the transition between a forward and a return run or vice-versa, comprising:

a structure mounted for rotation about an axis, the structure including an outer surface having a first plurality of keyways, at least one of the first keyways being truncated and hence extending only partially across the outer surface in an axial direction;

a first split sprocket comprised of a plurality of sections or segments, the first sprocket having an inner surface and a plurality of receivers;

a first plurality of keys, each for positioning at least partially in one of the receivers such that a portion thereof projects inwardly therefrom and is adapted for seating engagement in one of the keyways; and a fastener for fastening each sprocket section or segment to an adjacent sprocket section or segment.

10. The apparatus according to claim 9, wherein the rotatable structure is a cylindrical drum and the inner surface of each sprocket section or segment is arcuate.

11. The apparatus according to claim 9, wherein each receiver is substantially C-shaped, each key is cylindrical and is slidably received in the corresponding C-shaped receiver, and the corresponding keyway is semi-circular.

12. The apparatus according to claim 9, wherein the receivers are C-shaped, and each key is received in the corresponding receiver in snap-fit engagement.

13. The apparatus according to claim 9, wherein the width of each keyway in the axial direction is substantially identical to the width of the key and the length of each keyway at the surface of the rotatable structure is substantially equal to or less than the diameter of the key.

14. The apparatus according to claim 9, further including a fourth sprocket section or segment, wherein the fourth sprocket section or segment is secured to one of the at least two sprocket sections or segments and the third section or segment using the plurality of fasteners.

15. The apparatus according to claim 14, wherein the fourth sprocket section or segment includes a receiver for slidably receiving a key for engaging one of the first keyways.

16. The apparatus according to claim 9, further including a second plurality of keyways, at least one of the second keyways being truncated and extending only partially across the outer surface of the rotatable structure in the axial direction, the apparatus further including:

a second split sprocket comprised of at least two sections or segments having an inner surface and a plurality of receivers;

a second plurality of keys, each positioned at least partially in one of the receivers such that a portion thereof projects inwardly from the second split sprocket, the portion being adapted for seating engagement in one of the second plurality of keyways; and a second plurality of fasteners for fastening the at least two sections or segments of the second split sprocket together.

17. The apparatus according to claim 16, further including a third plurality of keyways, at least one of the third keyways being truncated and extending only partially across the outer surface of the rotatable structure in the axial direction, wherein the first or second split sprockets may alternately be aligned with the first, second, or third plurality of keyways.

18. A method of driving a conveyor belt using the apparatus of claim 9.

19. A sprocket assembly intended for use with an endless conveyor belt making a transition between a forward and a return run, comprising:

a drum mounted for rotation about an axis and adapted for positioning adjacent the transition, the drum including an outer surface including at least one first keyway and at least one second keyway spaced from the first keyway along the axis of rotation;

a plurality of sprockets, each including an opening for receiving the drum and at least one receiver; and a key for positioning in the receiver of each one of the plurality of sprockets and in a corresponding one of the first or second keyways.

20. The assembly of claim 19, wherein each receiver is substantially C-shaped, each key is cylindrical and is slidably received in the corresponding C-shaped receiver, and the corresponding keyway is semi-circular.

21. The assembly of claim 19, wherein at least one of the sprockets is a split sprocket.

22. The assembly of claim 21, wherein the split sprocket comprises a plurality of sprocket sections or segments, each of the sections or segments having an arcuate inner surface and at least two ends, each of the ends including an aperture;

a plurality of fasteners, each for fastening a first end of one of the plurality of sprocket sections to a second, corresponding end of an adjacent sprocket section, said fasteners including a threaded bolt for positioning through said apertures in said first and second ends and a nut for placement on a portion of said bolt projecting through one of said apertures;

wherein a centerline extending through a matching pair of the apertures is generally parallel to a line drawn tangent to a point at an interface between the ends of two adjacent sprocket sections or segments when positioned in an abutting relationship, and whereby tightening of the nut against a surface of the sprocket section or segment adjacent to the aperture through which the bolt projects creates a tension between the adjacent sprocket sections.

23. The assembly of claim 21, further including a plurality of first keyways spaced along the outer surface of the drum in a circumferential direction.

24. The assembly of claim 19, wherein each sprocket includes two spaced apart rows of teeth.

* * * * *